Feb. 10, 1959     A. U. KUTSAY     2,873,341
ELECTRIC STRAIN GAUGE AND RESISTANCE UNITS THEREFOR
Filed Aug. 3, 1955
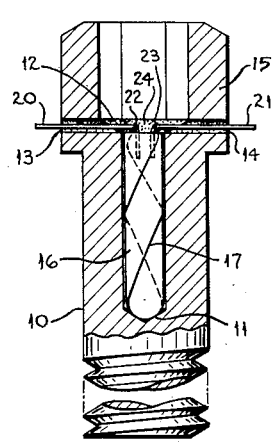
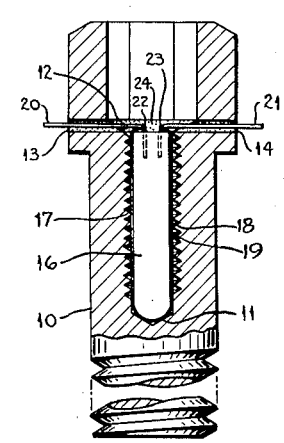
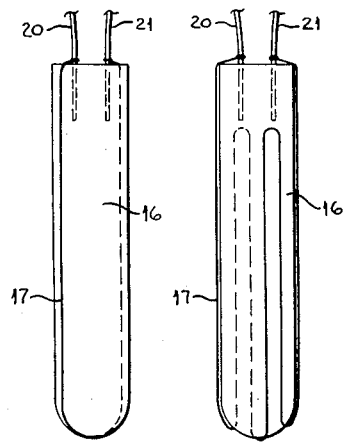
FIG.1    FIG.2    FIG.3    FIG.4
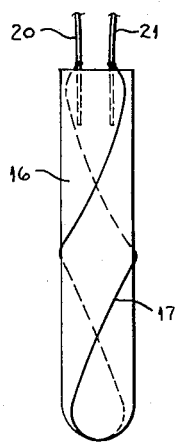
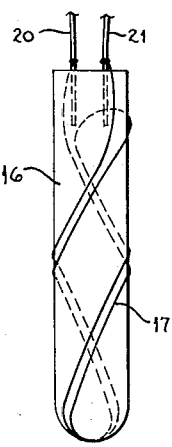
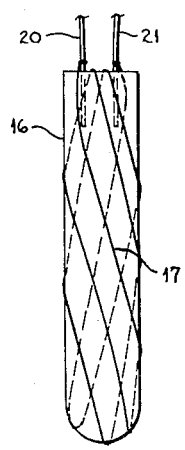
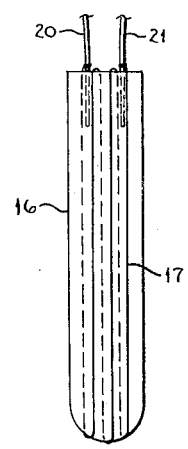
FIG.5    FIG.6    FIG.7    FIG.8
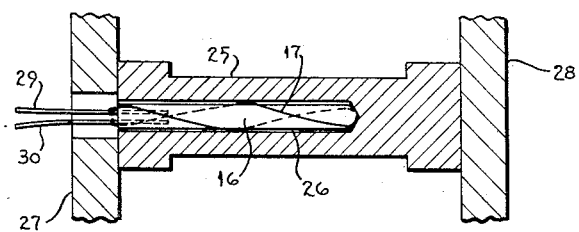
FIG.9
*INVENTOR.*
ALI UMIT KUTSAY
BY
*Van Deventer + Shively*
ATTORNEYS

United States Patent Office 2,873,341
Patented Feb. 10, 1959

2,873,341

ELECTRIC STRAIN GAUGE AND RESISTANCE UNITS THEREFOR

Ali Umit Kutsay, Norwalk, Conn.

Application August 3, 1955, Serial No. 526,206

7 Claims. (Cl. 201—63)

This invention relates to electric strain gauges and resistance units for use therewith.

An object is to provide a gauge of the class described wherein a wire resistance unit is imbedded within the body—such as a bolt or the like—which is subjected to either extension or compression strains. This construction gives improved results compared with gauges in which the resistance wire is placed about the surface of the body and is therefore displaced from the neutral longitudinal axis thereof in the case of a bolt or the like.

Another object is to provide a gauge of the class described which is simple to construct and which may be easily assembled by unskilled labor.

Another object is to provide a gauge of the class described which will give correct indications of longitudinal stress on the body which eliminates the effects due to bending the body.

A further object is to provide a resistance unit for use in a gauge of the class described which may be assembled and sold separately from the body in which the unit is used, thus enabling the units to be accurately assembled and tested separately from the body and shipped to a bolt manufacturer for example, for incorporation in bolts at the bolt factory or where the bolts are used.

Other objects and advantages will be apparent from a perusal of the following specifications whereby way of illustration preferred embodiments of the invention are disclosed. It will be understood that these disclosures are merely illustrative and not limitative of the invention, and that changes can be made without departing from the spirit of the invention as defined in the appended claims.

It will be noted that the term "body" used in the following specification is used generally to define a bolt, test piece, bar or other element used as a gauge per se or as part of a machine or the like in which the body is subjected to longitudinal extension or compression, the extent of which it is desired to measure. As such bodies are in common use and of a large variety of shapes and sizes, no attempt will be made to describe them except to point out the new features herein disclosed in detail of locating the resistance unit within the body and as nearly on the longitudinal axis thereof as possible.

It will also be noted that the fine metallic wire used in the resistance units herein disclosed is well known both as to dimensions and operating characteristics in strain gauges and is therefore not described in detail, as any suitable resistance wire composed for example of copper-nickel alloy and approximately .001 to .0031 inch in diameter can be used, insulated in any suitable manner, or insulated by coating with the potting compound hereinafter mentioned.

In the accompanying drawings:

Figure 1 is a longitudinal cross-sectional view of a strain gauge embodying the invention. The centre bore 11 and resistance unit 16 are enlarged as compared with the body 10 so that they can be seen.

Figure 2 is a fragmentary enlarged sectional view of a gauge embodying a modification in the construction shown in Figure 1.

Figures 3 to 8 inclusive disclose various types of winding that may be used in making the resistance units used in the gauge, Figures 1 or 2.

Figure 9 is a cross-sectional view of a compression gauge embodying the invention.

Referring to Figure 1, a typical strain gauge is shown, comprising the bolt 10 forming the body of the device are made of metal, plastic or any other material depending upon the characteristics desired. Such a metal bolt or cap screw 1" in diameter may have a central bore 11 at its longitudinal axis 3/32 inch in diameter and 1 inch deep from the upper edge 12. Suitable cross holes 13, 14 extend through the wall 15 of the head of the bolt, as shown.

A core 16 is made of "Epoxy" potting compound but may be made of metal, plastic or any other suitable material and upon this is secured in any suitable manner the solid metallic extensible and compressible filament or wire 17. If the core is of conducting material the wire 17 is insulated therefrom.

The resistance unit may be located at any part along the longitudinal axis of the bolt and may be of any desired length. It is desirable, however, to have the bore 11 as small as mechanical requirements will permit.

The core with the wire thereon is now dipped or coated with the "Epoxy" compound and pressed into the bore 11, the compound serving, if necessary, to insulate the wire from the bolt 10, and the compound seals the wire and core to the inner wall of the bore 11 so that the bolt, wire and core form a solid structure, all the parts being subject to any extension or compression of the bolt.

The imbedment of the electrical unit comprised of core 16 and wire 17 in the bolt may be accomplished in other ways than by that just described. It may be pressed in the bore 11 or if the core 16 is metallic, it may be contracted by cooling in Dry Ice or in any other manner and then inserted in the bore 11 and allowed to expand therein so that the wire 17 is squeezed against the inner wall of bore 11 to make a shrink fit.

To further insure that no movement takes place between the electrical unit and body 10, the bore 11 is roughened as by threading the same, as indicated at 18 in Figure 2 so that the bonding medium 19 surrounding the unit may extend into the roughened portion (threads) of the body and thereby prevent any relative movement of the body and unit.

Suitable insulated terminal wires 20, 21 are connected to the ends of the wire 17 and may be anchored on core 16 so as to take the strain from the connections 22, 23. Wires 20, 21 are now threaded through the cross-holes 13, 14 so as to be available for connection to a suitable resistance measuring device. The space 24 above wires 20, 21 may be filled with the potting compound. Obviously where the bolt 10 has a solid instead of a socket head, the wires 20, 21 may come straight out the top of the head.

As seen in Figure 3, the resistance wire 17 is wound back and forth to form a loop having substantially parallel sides.

In Figure 4 the wire 17 is wound in a plurality of parallel loops spaced about the outer face of the core 16.

In Figure 5 the wire 17 is wound spirally about the core 16.

In Figure 6 the wire 17 is wound in a double spiral about core 16, as shown.

Figure 7 illustrates another form of unit wherein the wire 17 is wound spirally, some of the turns extending over the top and bottom of the core 16.

Figure 8 is a form of unit wherein the wire 17 is wound lengthwise over the core 16 and some of the turns extend over the top and bottom of the core.

In Figure 9 is shown a gauge particularly adapted to measure compressive strains, such as a weighing or load gauge or cell.

Here the body 25 is of any suitable size and construction, and the resistance unit 26 of any of the forms shown in Figures 3 to 8 inclusive. The gauge is placed between the compression numbers 27, 28, one of which can form a fixed abutment.

The connecting wires 29, 30 may extend outwardly from either end of the body or through the side wall thereof.

In all cases the best results are obtained when the wire 17 has the greatest part of its length in the direction of the strain to which it is subjected. However, the spiralled form of winding shown in Figures 5, 6 and 8, has the advantage of compensating for the small deviation from the absolute neutral axis of the bolt 10 due to the necessary diameter of core 16.

It will be evident from the foregoing that an important feature of the invention is the provision of the resistance units shown in Figures 3 to 8 inclusive which can be fabricated, tested and adjusted for uniform normal resistance apart from the body 10. This permits of their quantity production apart from the body 10 with which they are ultimately associated. This also permits their use with rivets, bolts, beams and other structural parts in use by merely drilling holes in them, inserting the unit and applying the potting compound.

As the manner in which the changes in resistance of the wire 17 in gauges of this general description is measured, it is not here described in detail.

What is claimed is:

1. An electrical strain gauging device comprising, in combination, an elongated body of extensible and compressible material and having a longitudinal zone to be subjected to measured strain, and a solid cylindrical electrical resistance unit embedded in said body and lying at substantially the neutral longitudinal axis thereof, said unit being bonded to said body throughout the longitudinal extent of said zone, whereby said unit is directly subject to changes due to extension and compression of said body in said zone whereby the electrical resistance of said unit is varied.

2. In a strain gauging device of the class described, in combination, a slender solid cylindrical core composed of an extensible and compressible bonding medium, a continuous solid metallic extensible and compressible elongated resistance conductor continuously bonded to the exterior of said core in substantially longitudinal directional relation thereto throughout its effective length, and connecting wires secured to said resistance conductor and extending freely therefrom.

3. In a strain gauging device of the class described, in combination, a slender solid cylindrical core composed of an extensible and compressible bonding medium, a continuous solid metallic extensible and compressible filament bonded to said core throughout its effective length, said filament extending from the upper end of said core downwardly, over the lower end thereof and then upwardly to form a loop having sides substantially parallel to the axis of said core, and connecting wires secured to the ends of said filament.

4. In a strain gauging device, in combination, a slender solid cylindrical core composed of an extensible and compressible bonding medium, a continuous solid metallic extensible and compressible filament bonded to the exterior of said core throughout its effective length, said filament being formed into a plurality of loops extending from the top to the bottom of said core, the long legs of said loops being substantially parallel to the axis of said core, the ends of said filament terminating at the top of said core, and connecting wires secured to the ends of said filament.

5. In a strain gauging device of the class described, an electrical resistance unit comprising a slender solid cylindrical core composed of an extensible and compressible bonding medium having a continuous solid metallic extensible and compressible filament bonded thereto throughout its effective length, said filament being wound about said core in a helix having a longitudinal lead distance at least equal to the effective length of said core, and connecting wires secured to the ends of said filament and extending freely therefrom.

6. A strain gauging device having a body including a zone to be subjected to longitudinal strain for measurement, and a slender solid cylindrical resistance unit secured within said body in permanent radial compression substantially throughout the longitudinal extent of said zone.

7. An electrical strain gauging device including a body having a longitudinal bore at its neutral axis; a solid core composed of an extensible and compressible bonding medium secured directly to the wall of said longitudinal bore to expand and contract directly in unison therewith throughout the effective length of said core, said core having a continuous solid metallic extensible and compressible filament continuously bonded thereto throughout said effective length whereby the variation in either tension or compression strains in said body and core will be transmitted directly to said filament so as to vary the electrical resistance thereof, said wall of said bore in said body being roughened and said bonding medium extending into said roughened portion to increase the bond between said body and said core.

References Cited in the file of this patent

UNITED STATES PATENTS

| | | |
|---|---|---|
| 2,344,648 | Simmons | Mar. 21, 1944 |
| 2,465,981 | Robertson | Mar. 29, 1949 |
| 2,600,029 | Stone | June 10, 1952 |
| 2,629,801 | Warshaw | Feb. 24, 1953 |